(12) United States Patent
Narula

(10) Patent No.: US 11,830,085 B2
(45) Date of Patent: Nov. 28, 2023

(54) ENHANCED RATING INTERFACE AND TECHNIQUES

(71) Applicant: Vikas Narula, Minneapolis, MN (US)

(72) Inventor: Vikas Narula, Minneapolis, MN (US)

( * ) Notice: Subject to any disclaimer, the term of this patent is extended or adjusted under 35 U.S.C. 154(b) by 87 days.

(21) Appl. No.: 16/995,426

(22) Filed: Aug. 17, 2020

(65) Prior Publication Data

US 2021/0056643 A1 Feb. 25, 2021

Related U.S. Application Data

(60) Provisional application No. 62/888,610, filed on Aug. 19, 2019.

(51) Int. Cl.

| | |
|---|---|
| *G06Q 50/00* | (2012.01) |
| *G06F 16/9535* | (2019.01) |
| *G06F 9/451* | (2018.01) |
| *G06F 16/26* | (2019.01) |
| *G06Q 10/0639* | (2023.01) |
| *G06F 16/9536* | (2019.01) |
| *G06Q 10/105* | (2023.01) |

(52) U.S. Cl.
CPC ............. *G06Q 50/01* (2013.01); *G06F 9/451* (2018.02); *G06F 16/26* (2019.01); *G06F 16/9535* (2019.01); *G06F 16/9536* (2019.01); *G06Q 10/06398* (2013.01); *G06Q 10/105* (2013.01)

(58) Field of Classification Search
CPC .. G06Q 50/01; G06Q 10/063; G06Q 10/0639; G06Q 10/06393; G06Q 10/06395; G06Q 10/06398
See application file for complete search history.

(56) References Cited

U.S. PATENT DOCUMENTS

| | | | |
|---|---|---|---|
| 8,744,904 B2 * | 6/2014 | Lindia .............. | G06Q 10/06398 |
| | | | 705/7.42 |
| 2006/0031115 A1 * | 2/2006 | Eisma .................... | G06Q 10/06 |
| | | | 705/7.14 |

(Continued)

OTHER PUBLICATIONS

Harvard Business Review article entitled, "Informal Networks: The Company Behind the Chart," by David Krackhardt and Jeffrey R. Hanson (Jul.-Aug. 1993 Issue), 12 pages.

*Primary Examiner* — William S Brockington, III
(74) *Attorney, Agent, or Firm* — Merchant & Gould P.C.

(57) ABSTRACT

Techniques for providing improved rating interfaces and techniques as applied to providing and measuring dynamic self-awareness within human networks. A server transmits to a plurality of computing devices a first command for each respective device to display a self-rating user interface and receive a self-rating input from a respective user. The server receives the plurality of self-rating inputs from the plurality and transmits to the plurality a second command for each respective computing device to display a peer rating user interface and receive a peer rating input from a respective user. The server receives the plurality of peer rating inputs from the plurality and calculates statistics comparing the self-rating inputs and the peer rating inputs from the plurality of respective users. The server transmits to the plurality, a third command for each respective computing device to display, by the respective computing device, a summary of the calculated statistics.

20 Claims, 14 Drawing Sheets

(56) References Cited

U.S. PATENT DOCUMENTS

| | | | |
|---|---|---|---|
| 2006/0227750 A1* | 10/2006 | Soltanian | H04B 1/7075 |
| | | | 370/335 |
| 2008/0208671 A1* | 8/2008 | Ehrlich | G06Q 10/063112 |
| | | | 705/7.14 |
| 2012/0032961 A1* | 2/2012 | Smith | G06T 11/206 |
| | | | 345/440 |
| 2014/0279625 A1* | 9/2014 | Carter | G06Q 50/01 |
| | | | 705/319 |
| 2016/0321408 A1* | 11/2016 | Harmon | G06Q 30/0282 |
| 2017/0109679 A1* | 4/2017 | Zhao | G06Q 30/016 |
| 2017/0293874 A1* | 10/2017 | Asaf | G06N 3/0436 |
| 2018/0374027 A1* | 12/2018 | Sampath | G06Q 10/06398 |

* cited by examiner

ENHANCED RATING INTERFACE AND TECHNIQUES

CROSS-REFERENCE TO RELATED APPLICATIONS

This application claims priority to U.S. Provisional Patent Application No. 62/888,610, which was filed Aug. 19, 2019, and which is hereby incorporated herein by reference in its entirety for any and all purposes.

TECHNICAL FIELD

The present disclosure includes improved rating interfaces and techniques as applied to providing and measuring dynamic self-awareness metrics for human networks.

BACKGROUND

A "human network" or "social network" is a theoretical construct useful in the social sciences to study relationships between individuals, groups, organizations, or even entire societies. The term can be used to describe a social structure determined by such interactions. The ties through which any given social unit connects represent the convergence of the various social contacts of that unit.

Social network analysis ("SNA") or organizational network analysis ("ONA") is a process of investigating social structures using networks and graph theory. SNA/ONA characterizes networked structures in terms of nodes (e.g., individual actors, people, or things within the network) and the ties, edges, or links (e.g., relationships or interactions) that connect the nodes. Examples of social structures commonly visualized through social network analysis include social media networks, memes spread, information circulation, friendship and acquaintance networks, business networks, social networks, collaboration graphs, kinship, disease transmission, etc.

Most organizations have a formal structure that describes the leadership of the organization; this formal structure is usually hierarchical in nature and illustrated in an organizational chart. However, almost all organizations have an informal network, which is an interlocking social structure that governs how people within the organization actually work together in practice. An informal network is the aggregate of personal and professional connections, through which work is performed and by which relationships are built among people who share a common organizational affiliation. Informal networks are explained in a Harvard Business Review article entitled, "Informal Networks: The Company Behind the Chart," by David Krackhardt and Jeffrey R. Hanson (July-August 1993 Issue).

SUMMARY

In an example, there is a method comprising: transmitting, by a server to a plurality of computing devices, a first command for each respective computing device in the plurality of computing devices to: display a self-rating user interface; and receive a self-rating input from a respective user; receiving, by the server, the self-rating inputs from the plurality of computing devices; transmitting, by the server to the plurality of computing devices, a second command for each respective computing device in the plurality of computing devices to: display, a peer rating user interface; and receive a peer rating input from the respective user; receiving, by the server, the peer rating inputs from the plurality of computing devices; calculating statistics comparing the self-rating inputs and the peer rating inputs; and transmitting, by the server to the plurality of computing devices, a third command for each respective computing device in the plurality of computing devices to: display a summary of the calculated statistics of the respective user.

In another example, there is a system comprising: a plurality of computing devices; and a server. The server is configured to: transmit, to the plurality of computing devices, a first command for each respective computing device in the plurality of computing devices to: display a self-rating user interface; and receive a self-rating input from a respective user; receive the self-rating inputs from the plurality of computing devices; transmit, to the plurality of computing devices, a second command for each respective computing device in the plurality of computing devices to: display, a peer rating user interface; and receive a peer rating input from the respective user; receive the peer rating inputs from the plurality of computing devices; calculate statistics comparing the self-rating inputs and the peer rating inputs; and transmit, to the plurality of computing devices, a third command for each respective computing device in the plurality of computing devices to: display a summary of the calculated statistics of the respective user.

In a further example, there is a machine-readable storage medium comprising instructions that, when executed by a processor of a machine, cause the machine to: transmit, to a plurality of computing devices, a first command for each respective computing device in the plurality of computing devices to: display a self-rating user interface including a self-rating four quadrant matrix; and receive a self-rating input from a respective user as a selection of a location within the self-rating four quadrant matrix; receive the self-rating inputs from the plurality of computing devices; calculate statistics based on the self-rating inputs; and transmit, to the plurality of computing devices, a third command for each respective computing device in the plurality of computing devices to: display a summary of the calculated statistics of the respective user, wherein to display the summary includes to display a user interface having a four quadrant matrix.

BRIEF DESCRIPTION OF THE DRAWINGS

In the drawings, which are not necessarily drawn to scale, like numerals may describe similar components in different views, and like numerals having different letter suffixes may represent different instances of similar components. The drawings illustrate generally, by way of example, but not by way of limitation, various embodiments or examples discussed in the present document.

DETAILED DESCRIPTION

Figure 1:
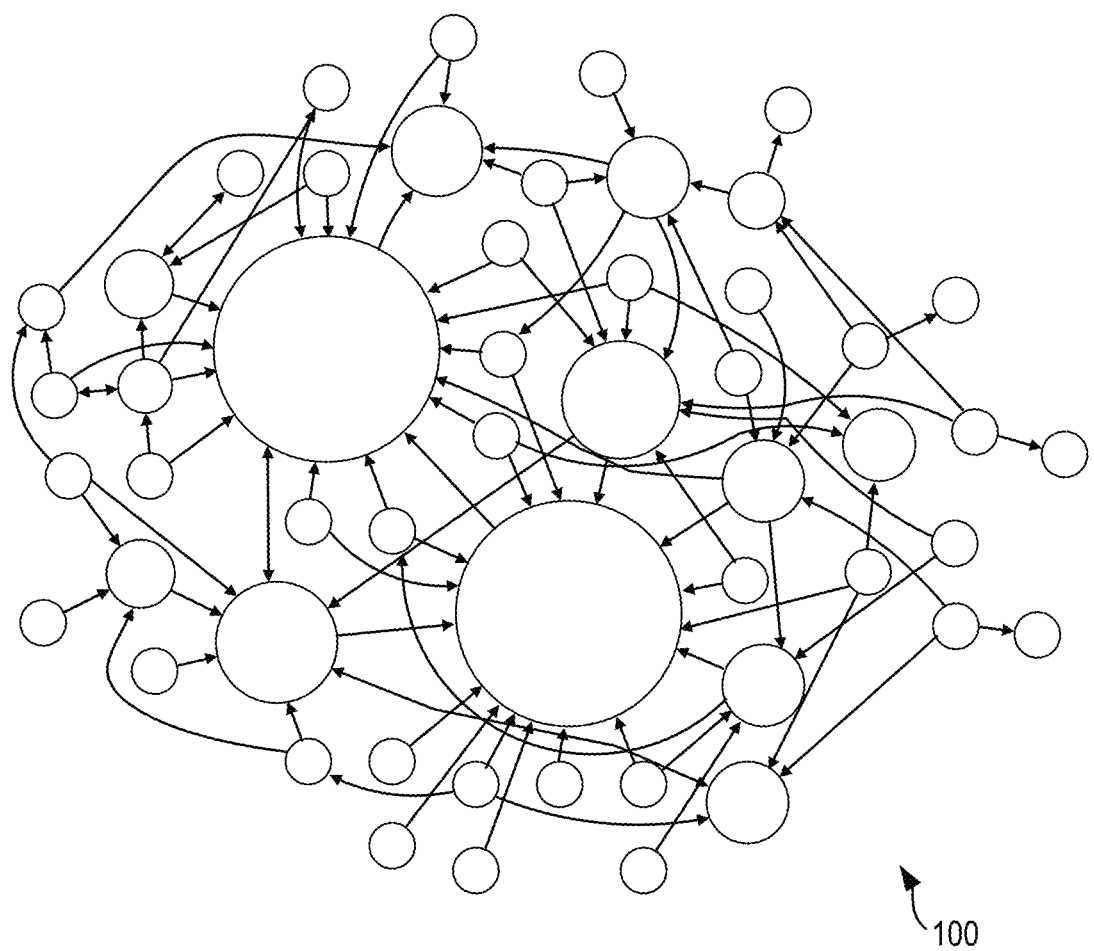
FIG. 1 illustrates a map of an informal human network, according to an example embodiment.

The present disclosure includes methods, systems, and computer program products that individually provide improved rating interfaces and implement techniques applicable to dynamic self-awareness within human networks. In the following detailed description, for purposes of explanation, numerous specific details are set forth in order to provide a thorough understanding of the various aspects of the presently disclosed subject matter. However, it will be evident to those skilled in the art, after reading and understanding the present subject matter, that the presently disclosed subject matter may be practiced without these specific details. In other instances, well-known methods, procedures, and components have not been described in detail so as not to obscure the presently disclosed subject matter.

Informal networks are rarely mapped or illustrated. However, mapping a human network of a workplace, especially when the map is created with data acquired from a 360-degree feedback process, can produce many benefits: it can reveal what is really going on in an organization (e.g., who has influence and how teams are working together or not, among other aspects) and it enables the leadership of the organization to use this information to make better decisions in terms of succession, change management, and collaboration.

Achieving accurate self-awareness within an organization is particularly challenging. Humans in general—especially senior leaders—are not great at assessing their own influence. Leaders frequently overestimate or inflate their perceived influence, and they often do not understand the kind of impact (or lack thereof) they have on their teams, whether it be positive or negative.

As difficult as it is for humans to assess influence, humans have a more intuitive understanding of the qualitative social factors that go into such determinations. But it is difficult to provide a computerized system that can take into account such factors. Further, while computers are best able to perform calculations on quantitative data, humans have difficulty in accurately providing computer-friendly quantitative input regarding qualitative social factors. Further still, humans often have difficulty understanding the output of computerized processing of relationships (e.g., intuitively understanding the difference between a rating of 4.5/5 as compared to a rating of 4.2/5). In other words, something is lost in humans providing relationship and other rating data to a computer for processing and in obtaining the results from the computer. Thus, providing a computer to perform assessments of self-awareness and other organizational measurements goes beyond a computer merely automating a human mental process because humans and computers are differently equipped to handle such processing. Applications of technology disclosed herein can provide improved facilitation of processing at least by providing user interfaces that facilitate the more accurate obtaining of data by a computer for use in performing calculations. The improvement in accuracy of data collection improves the accuracy of output. Further, disclosed output user interfaces can facilitate the comprehensibility of the output to a user. Other improvements and applications of disclosed technology will be apparent to one of skill in the art.

Influence within an informal network can be measured by various techniques, including: (1) receiving perceived self-ratings from people within the informal network, (2) receiving ratings for other people within the informal network, and then (3) measuring the difference between a person's self-rating and ratings of the person from other people in the informal network.

FIG. 1 illustrates a map 100 of an informal human network, according to an example embodiment. In this map 100, each circular node represents a human within the network, and each line (or "arc") between two nodes represents a relationship between the respective humans. The relative size of the nodes is related to a number of connections that the node has. In an embodiment, an arc may be non-directional, unidirectional, or bidirectional. While an organization can have organization charts or other formalized structures, organization often have challenges mapping and understanding such informal relationships between individuals.

Figure 2:
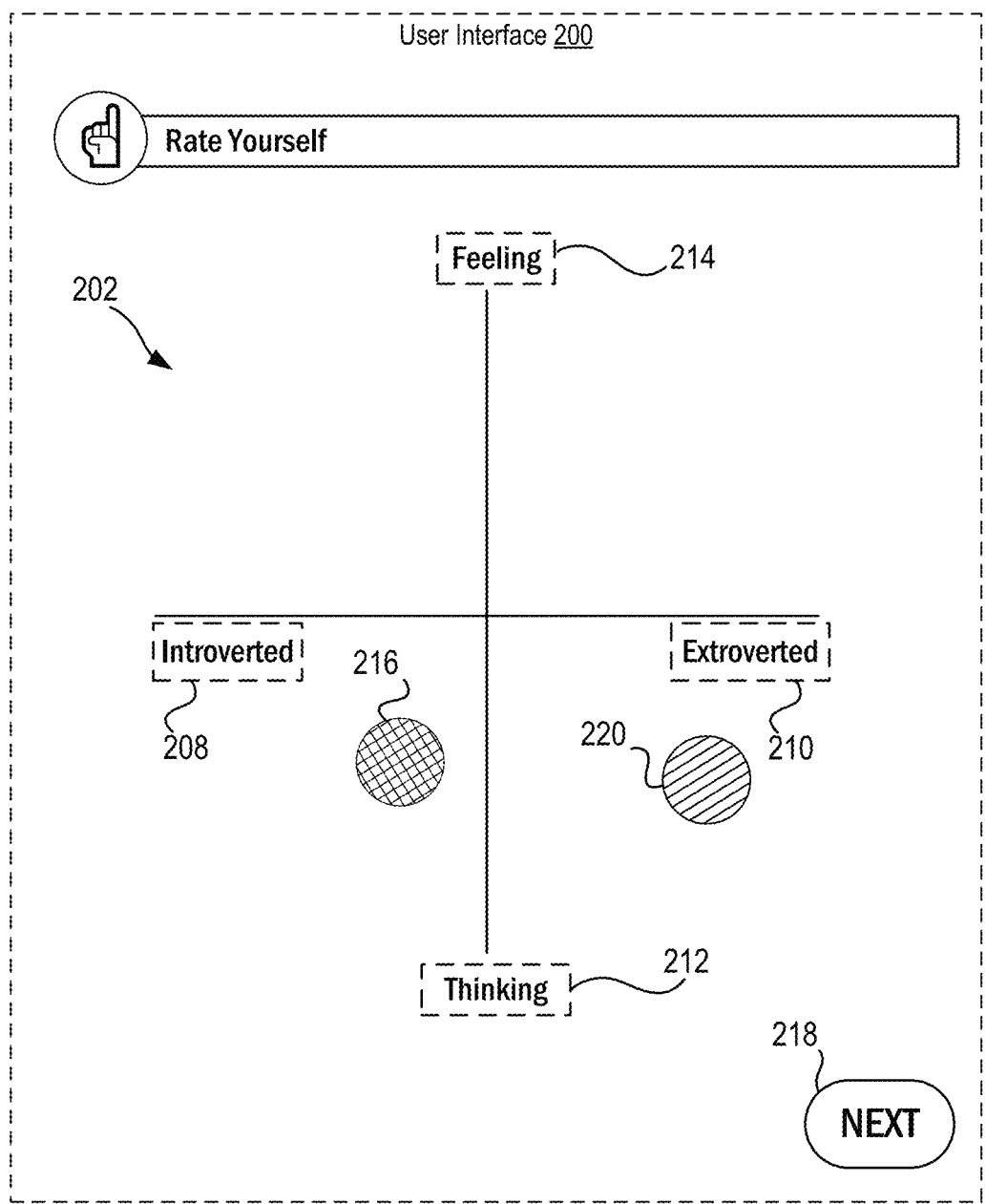
FIG. 2 illustrates an example self-rating user interface over which a system can receive user input relating to a self-rating.

FIG. 2 illustrates an example self-rating user interface 200 configured to receive, from a user, input indicating a self-rating. The self-rating user interface 200 can be presented to each individual within a group of people (e.g., a team, a workgroup, a department, etc.). The self-rating can be for one or more attributes or characteristics. An attribute or characteristic can be on a continuum between two opposites (e.g., introversion/extroversion, thinking/feeling, etc.) or can be a represented by a magnitude on a scale (e.g., subject matter expertise, trust, team cohesion, etc.). Other data can also be obtained. To receive the self-rating input, the self-rating user interface 200 can include one or more of a chart, a graph, a slider, radio boxes, checkboxes, etc.

In the example embodiment illustrated in FIG. 2, the self-rating user interface 200 includes a four-quadrant chart 202 configured to receive user input on two continuums. As illustrated, the user interface 200 includes labels, including a first label 208 ("introversion") and a second label 210 ("extroversion") to define a continuum along which the user interface 200 can receive user input corresponding to the first label 208 versus the second label 210 ("introversion" versus "extroversion"). The illustrated user interface 200 further includes a third label 212 ("thinking") and a fourth label 214 ("feeling") to define a continuum along which the user interface 200 can receive user input corresponding to the third label 212 and the fourth label 214 ("thinking" versus "feeling"). For instance, the user interface 200 receives a selection, from the user, of a location on the chart 202 that the user believes accurately represents the user's current characteristic(s). In the illustrated example, the user interface 200 is configured to receive at least two selections from the user: a first selection 216 and a second selection 220. In the illustrated example, the selections 216, 220 are in the form of user interface elements (e.g., dots) manipulatable by the user (e.g., by dragging and dropping or otherwise moving the elements around the user interface 200) to indicate a user's rating regarding the labels 208, 210, 212, 214. In the illustrated example, the chart 202 defines a two-dimensional area in which the user can provide input with the selections 216, 220. For instance, a single position of the selection 216, 220 can indicate input within the two dimensional area with respect to both labels 208, 210 of a first continuum and labels 212, 214 of a second continuum. The first and second selections 216, 220 can be used to obtain various kinds of data, such as temporally different data (e.g., the first selection 216 corresponds to a past or current state and the second selection 220 corresponds to a current or future state). In the illustrated example, the first selection 216 corresponds to how the user believes himself or herself to be currently and the second selection 220 corresponds to how the user wants to be. In particular, FIG. 2 shows that user interface 200 received a first selection 216 from a user indicating that the user self-rated himself or herself as currently being more introverted than extroverted and more thinking than feeling, and received a second selection 220 from a user indicating that the user self-rated himself or herself as wanting to be more extroverted.

The user interface 200 can receive data in any of a variety of different ways. For instance, if a selection 216, 220 within a control of the self-rating user interface 200 is not already a numerical value, the selection 216, 220 is converted into a numerical value. In the example illustrated in FIG. 2, the four-quadrant chart 202 uses a Cartesian coordinate system, where each selection 216, 220 is converted into a point having an x component and a y component denoting the values of the selection 216, 220 projected onto the x and y axes of the chart 202, respectively. In other examples, a polar coordinate system or other coordinate systems can be used.

After the user interface 200 receives the user's self-rating, the user interface 200 can receive an indication from the user that the user is ready to proceed to the next step of the process. In the example embodiment illustrated in FIG. 2, the user interface 200 provides a button or other user interface element 218 (e.g., labeled as "Next") to receive an indication that the user is ready to proceed. Responsive to detecting the actuation of the user interface element 218, the system can present different interfaces depending on whether the rating is being performed synchronously or asynchronously. The system can receive input from a facilitator regarding whether the rating exercise is synchronous or asynchronous.

In a synchronous example, the rating exercise cannot progress to a subsequent stage of the rating exercise until the current stage of the exercise has been completed by all of the group's participants or until a facilitator releases the rating exercise to the next stage. As such, responsive to detecting the actuation of the user interface element 218, the system presents a wait interface on the user's device until a condition is met (e.g., all users submitting a rating or the facilitate unlocked the next step). Once the condition is met, the user can be presented the user interface 300 of FIG. 3.

In an asynchronous example, each participant's progress through the stages of the rating exercise is independent of the progresses of other participants. As such, responsive to detecting the actuation of the user interface element 218, the system transitions to the user interface 300 of FIG. 3.

The use of multiple axes over which to receive input can provide technical advantages. For example, the use of a user interface that receives data over two axes is more efficient than a user interface that receives data over one axis by increasing the amount of information able to be obtained. In addition, the quality of the data is increased because the multi-axis user interface enables a user to visualize the relationship between the data on the multiple axes.

Figure 3:
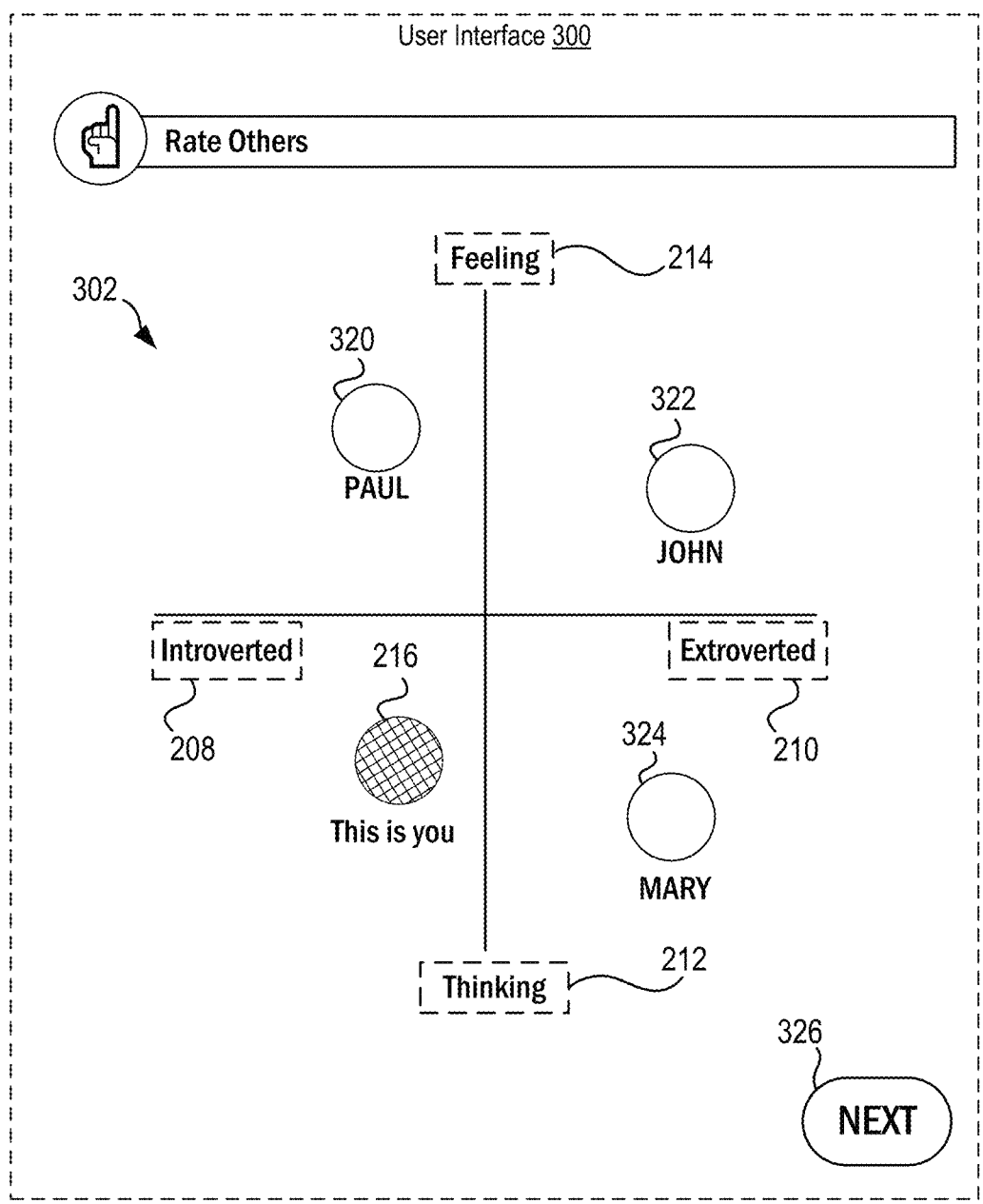
FIG. 3 illustrates an example group rating user interface over which a system can receive user input ratings for others.

FIG. 3 illustrates an example group rating user interface 300 configured to receive, from a user, ratings for others. For instance, in a synchronous example, after input is received from all users (e.g., using the user interface 200 of FIG. 2), the system releases the users from the waiting interface and causes each user's device to present the group rating user interface 300. In an asynchronous example, the group rating user interface 300 can be displayed substantially instantaneously after the user actuates the user interface element 218. The group rating user interface 300 can be configured to receive, from users, ratings for the user's peers (e.g., other users in the group that are participating in this rating activity). In the illustrated example, the group rating user interface 300 includes a chart 302 formatted as a four quadrant chart within which user interface elements ("selections" as described below) are manipulatable by a user to provide data. The chart 302 can be formatted in other ways, such as a one quadrant chart or another kind of chart or display grid.

The illustrated group rating user interface 300 includes aspects of the user interface 200 of FIG. 2. In an embodiment, the user interface 300 is configured to receive user-provided selections corresponding to ratings of a peer within the chart 302. In the illustrated example, the user interface 300 includes a third selection 320, a fourth selection 322, and a fifth selection 324 in the form of user interface elements (e.g., a circle or dot) manipulatable by the user to rate a peer (e.g., by dragging-and-dropping a selection 320, 322, 324 to a location on the group rating user interface 300 corresponding to a rating). As illustrated, the selections 320, 322, and 324 include labels corresponding to a peer's name. In other implementations there may be more or fewer selections corresponding to more or fewer peers. Further, although the peers are identified as individuals in this example, in other examples, the peers being rated can be groups of individuals. For instance, a person may be asked to rate different business units or logical groups of a business.

In some examples, the group rating user interface 300 is prepopulated with user interface elements corresponding to peers either on or off the chart 302, and the system is configured to not register a rating of a corresponding peer unless the user moves the user interface element on the chart 302. In another embodiment, the user interface 300 or another user interface provides a menu from which peers are selectable for rating. Responsive to a peer being selected for rating, a user interface element corresponding to the peer appears on the chart. In an example, the system is configured to permit a user to type in the name of a peer (e.g., in a text field) to add a user interface element corresponding to the peer to the chart. Providing the user with the ability to selectively rate peers provides various advantages. For example, by permitting the user to deselect peer that the user does not want to rate, the system needs to process less information (e.g., thereby conserving processing resources) and improves the quality of data by only receiving data for peers that the user chose to rate. Further, the ability to select peers that the user desires to rate permits a more accurate generation of an informal network diagram, such as the one shown in FIG. 5.

In the illustrated example, the first selection 216 received from the user who rated himself or herself in FIG. 2 is displayed on the chart. This display of the first selection 216 (e.g., how the user rated himself or herself) can facilitate the receiving of accurate data by anchoring the user's input of peers relative to how the user rates himself or herself. The illustrated user interface 300 further includes the third selection 320 (corresponding to "Paul"), the fourth selection 322 (corresponding to "John"), and the fifth selection 324 (corresponding to "Mary"). Once a user is done rating the user's peers, the system presents another waiting interface until all users in the group have rated their peers.

The user interface 300 can receive data in any of a variety of different ways. For instance, if a selection 320, 322, 324 within a control of the user interface 300 is not already a numerical value, the selection 320, 322, 324 is converted into a numerical value. In the example illustrated in FIG. 3, the four-quadrant chart 302 uses a Cartesian coordinate system, where each selection 320, 322, 324 is converted into a point having an x component and a y component denoting the values of the selection 320, 322, 324 projected onto the x and y axes of the chart 302.

After the user interface 300 receives the user's self-rating, the user interface 300 can receive an indication from the user that the user is ready to proceed to the next step of the process. In the example embodiment illustrated in FIG. 3, the user interface 300 provides a button or other user interface element 326 (e.g., labeled as "Next") to receive an indication that the user is ready to proceed. Responsive to detecting the actuation of the user interface element 326, the system can take different steps depending on the configuration of the rating exercise. For instance, in some examples, the rating exercise is complete from the user's perspective, and in such examples, a screen thanking the user can be presented. In other examples, the user is taken to one or more summary screens. Where the rating exercise is a synchronous rating exercise, responsive to actuation of the user interface element 326, the system presents a wait interface on the user's device until a condition is met. For instance, the condition can be that the system has received, from all users in the group, the peer ratings or that the facilitator has unlocked the next step. Where the rating exercise is an asynchronous rating exercise, responsive to actuation of the user interface element 326, the system presents user interface 400 of FIG. 4.

Figure 4:
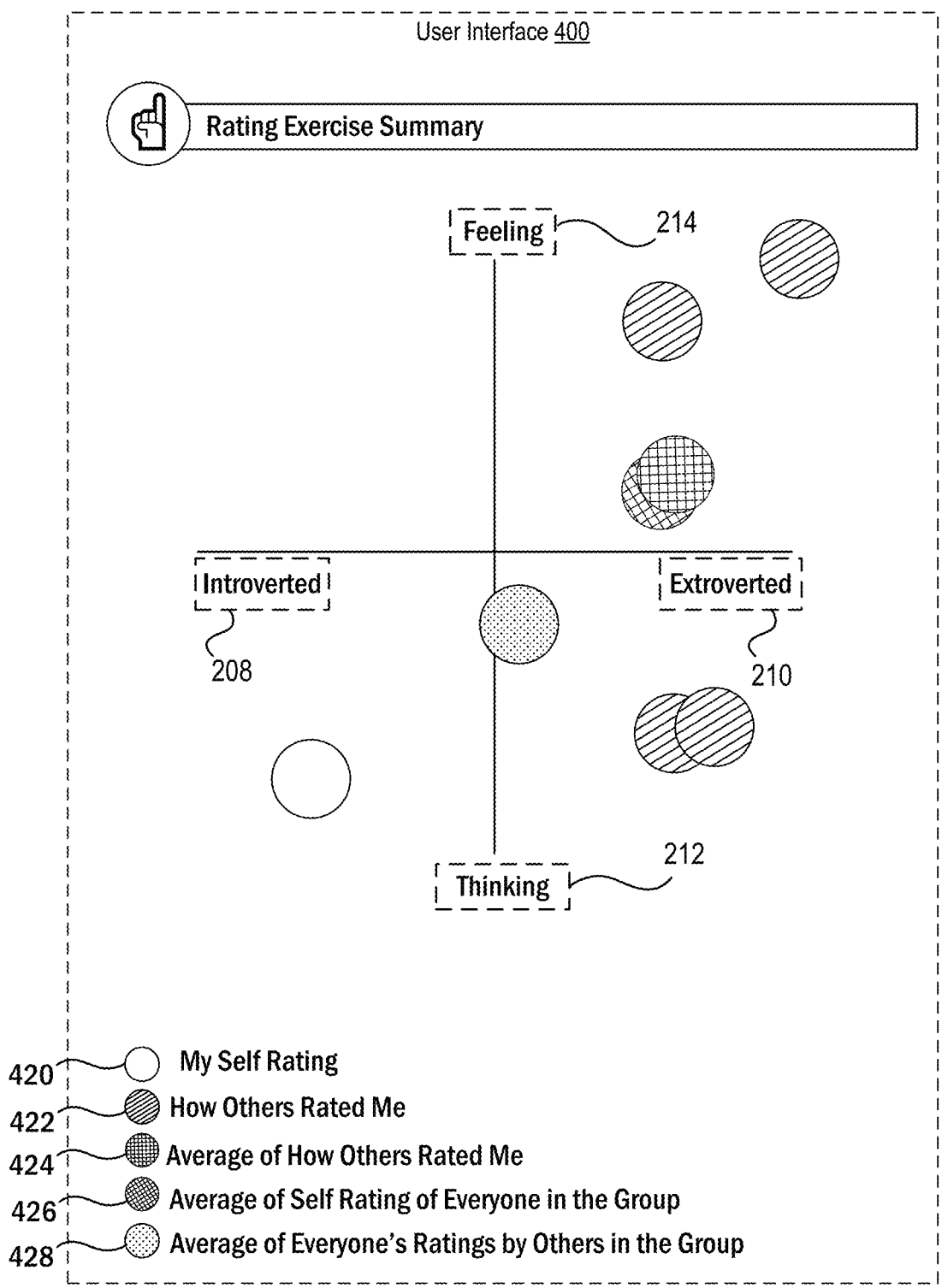
FIG. 4 illustrates an example summary user interface that displays a graphical summary of the rating exercise.

FIG. 4 illustrates a summary user interface 400 that displays a summary of the rating exercise, according to an example embodiment. The summary user interface 400 displays a summary of how the respective user was rated relative to the respective user's own self-rating.

In a synchronous rating exercise, after all of the ratings from the group have been received or the facilitator otherwise releases the group, the system can calculate statistics using the ratings received over the user interfaces 200, 300 from the various participating users. After calculating, the system can release the users' devices from the second waiting interface, and present on each user's device the summary user interface 400.

In an asynchronous rating exercise, the summary user interface 400 can be generated based on currently available information. The summary user interface 400 can be updated in real time as other users submit their ratings. In some examples, the real time update automatically updates the user interface 400 so the changes are reflected automatically.

In other examples, the user interface 400 is refreshed manually by the user or after a predetermine amount of time passes. In some examples, the user interface 400 can further display an indication of how many other responses have been received. For instance, the user interface 400 can display an indication of what percentage of peers have responded.

The (nearly) instantaneous display of the summary after the completion of the rating exercise can give a participant a sense for one or more of: their level of awareness, their influence on others, their self-perception of their influence on others, among other things. Furthermore, aggregated data can be presented, analyzed, and interpreted to assess a group's overall level of self-awareness, personality, culture, and team functioning.

In an embodiment, the rating exercise summary displayed in the user interface 400 may be graphical, numerical, or both. In the illustrated example of FIG. 4, the rating exercise summary is presented graphically as a four-quadrant chart with five different types of values: my self-rating 420, how others rated me 422, the average of how others rated me 424, the average self-rating of everyone in the group 426, and the average of everyone's ratings by others in the group 428. Other examples can have more or fewer kinds of ratings available. Advantageously, the providing of the user interface 400 in the multi-axis format can make the results easier to understand to the user.

Figure 5:
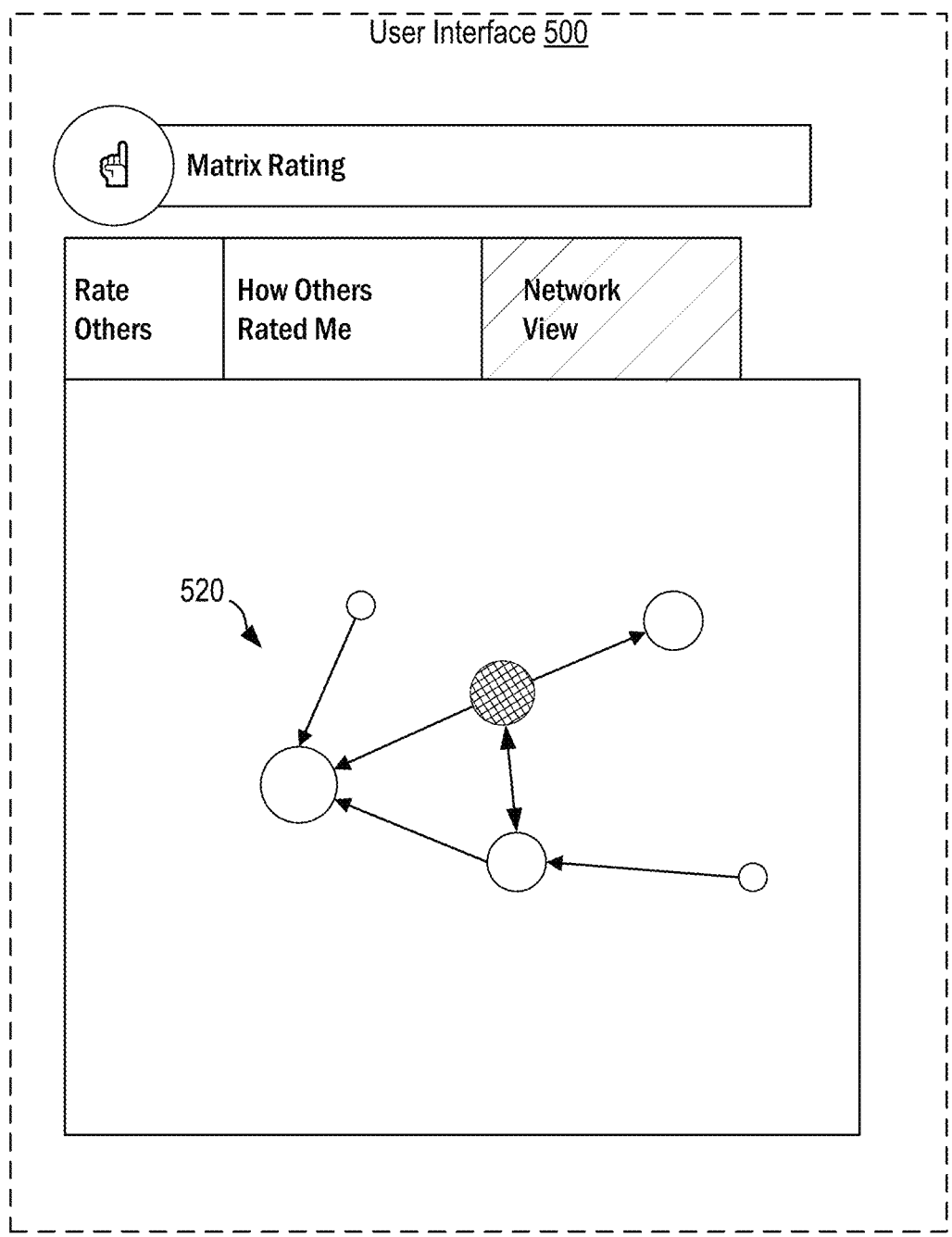
FIG. 5 illustrates an example social network diagram (e.g., map) generated from the data received during the rating exercise.

FIG. 5 illustrates a user interface 500 displaying a social network diagram (e.g., map) 520 generated from the data received during the rating exercise, according to an example embodiment. The system can generate a social network diagram 520 illustrating the participants of the rating exercise. For example, the generating can include forming nodes corresponding to participants (e.g., both raters and people being rated). Connections between the nodes indicate ratings, with directionality indicating that the source node rated the node being pointed to. For example, a first person may have rated a second person, but the second person may not have rated the first. Thus, the first person and the second person can be represented as two nodes with an arrow pointing from the first person to the second person. The nodes can include a distinguishing feature based on the number of ratings that the corresponding person has received. For instance, the size of the nodes is scaled based on the number of ratings that the associated person received (e.g., the more ratings that a person received, the larger the associated node is. Such a visualization of a network of individuals can facilitate a viewer's understanding of team dynamics, influence, and siloing that can be used to inform strategies to create greater collaboration, communication, and connectedness across teams. Further, the visualization in this manner can improve the ability of the system to convey information to a user in an efficient manner.

In an asynchronous rating exercise, the user interface 500 can be generated based on currently available information. For instance, some users may not have provided ratings yet, and those individuals can be represented as nodes without any arrows originating at that node. However, such nodes may nonetheless have arrows directed to them because others have provided ratings of the represented individual. The summary user interface 500 can be updated in real time as other users submit their ratings. In some examples, the real time update automatically updates the user interface 500 so the changes are reflected automatically. In other examples, the user interface 500 is refreshed manually by the user or after a predetermine amount of time passes. In some examples, the user interface 500 can further display an indication of how many other responses have been received. For instance, the user interface 500 can display an indication of what percentage of peers have responded.

In some examples, the nodes are shown as representing the individuals by being labeled with a label marking the node as representing the individual. In addition or instead, the node can be in the form of a picture of the individual (e.g., a circularly cropped picture where the node is circular). Such photos can be provided by the users themselves or automatically pulled from a database of photos of the individuals (e.g., from a corporate photo directory, from a social network, or from a business network).

Figure 6A:
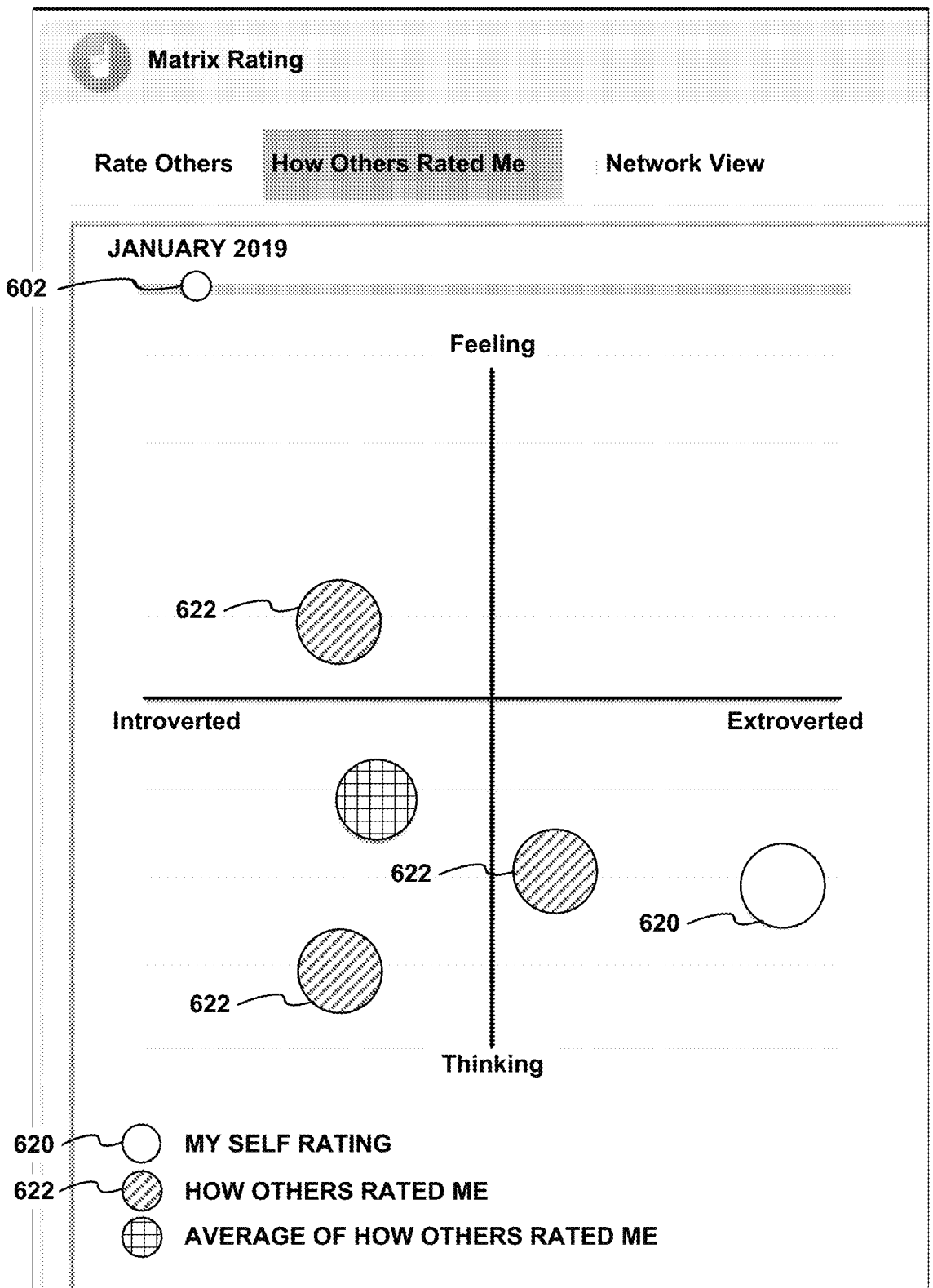
FIG. 6a illustrates an example user interface that displays a graphical summary of the results of the rating exercise at one point in time.

FIG. 6A illustrates an example user interface 600 that displays a graphical summary of the results of the rating exercise performed at a first time (in the illustrated example, January 2019). The user interface 600 includes a user interface element 602 configured to change a time associated with the summary being displayed. The illustrated user interface element 602 is in the form of a slider but can take other forms, such as a drop-down menu. Such an interface 600 can be useful when multiple rating exercises are performed. The ability to change a time associated with the results can facilitate quick and efficient comparison of results over time.

In an embodiment, the rating exercise can be configured as a continuous, real-time rating process, where the system presents a user interface 600 that displays summary ratings over time in a continuous, real-time manner; displaying ratings this way allows a user to see how the user's self-perception compares to other users' perception of the user over time. For example, as the user's peers rate the user, the summary screen will automatically update in real time.

In the illustrated example of FIG. 6A, the summary shows that there is a significant discrepancy between the user's self-rating, which is indicated by element 620, and the ratings given to the user by other users, which are indicated by elements 622. Such discrepancies suggest the existence of a disconnect between the self-perception of the user and the perceptions of other users about the user. Thus, the illustrated user interface 600 efficiently conveys this disconnect in self-perception and others' perceptions in an efficient manner.

Figure 6B:
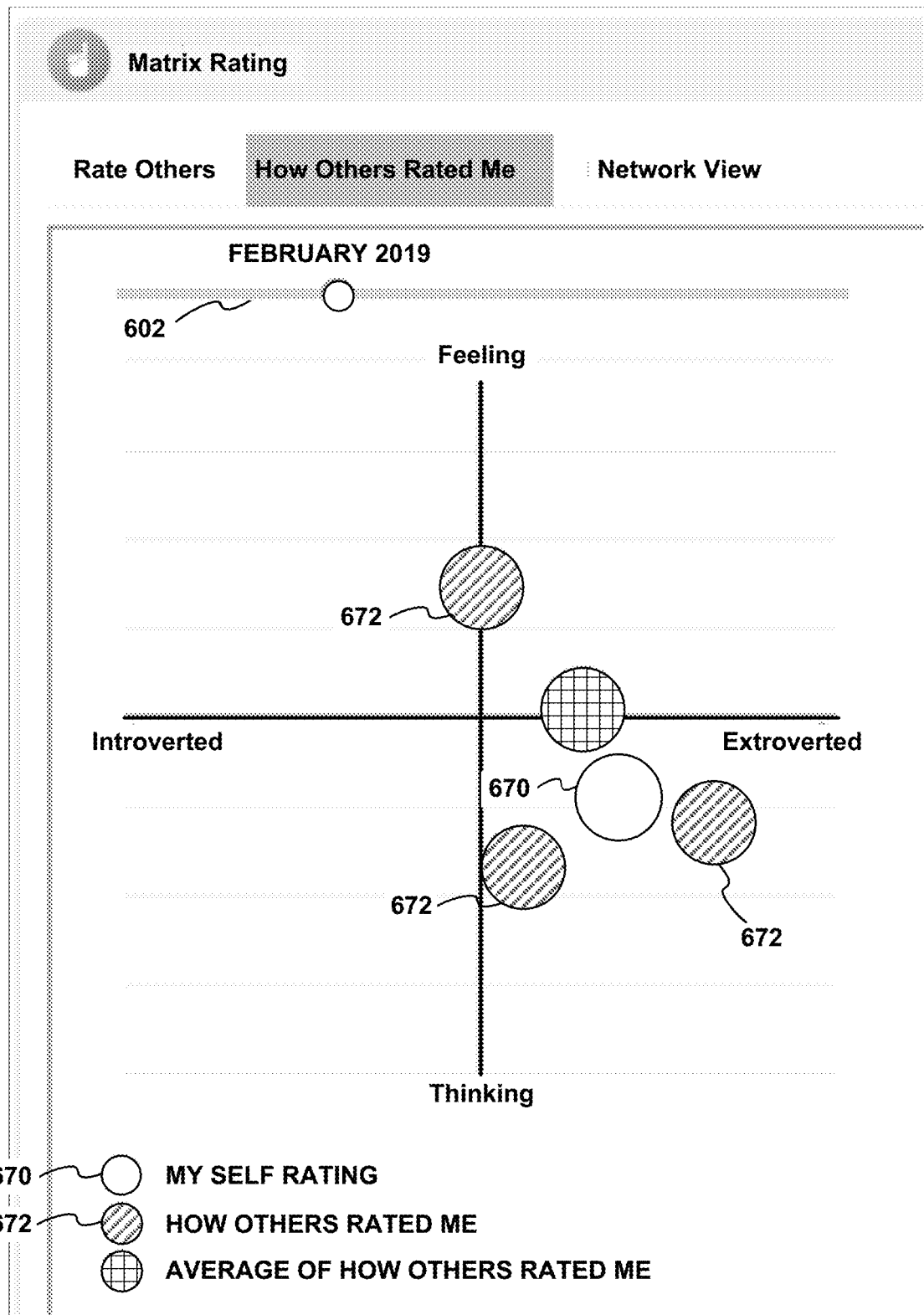
FIG. 6b illustrates an example user interface that displays a graphical summary of the results of the rating exercise at a later point in time.

FIG. 6B illustrates an example user interface 650 that displays a summary of the results of the rating exercise performed at a second time (in the illustrated example, February 2019). In the illustrated example of FIG. 6B, the discrepancy between the user's self-rating 670 and the ratings given to the user by other users 672 has decreased considerably from the discrepancy illustrated in FIG. 6A.

Figure 7:
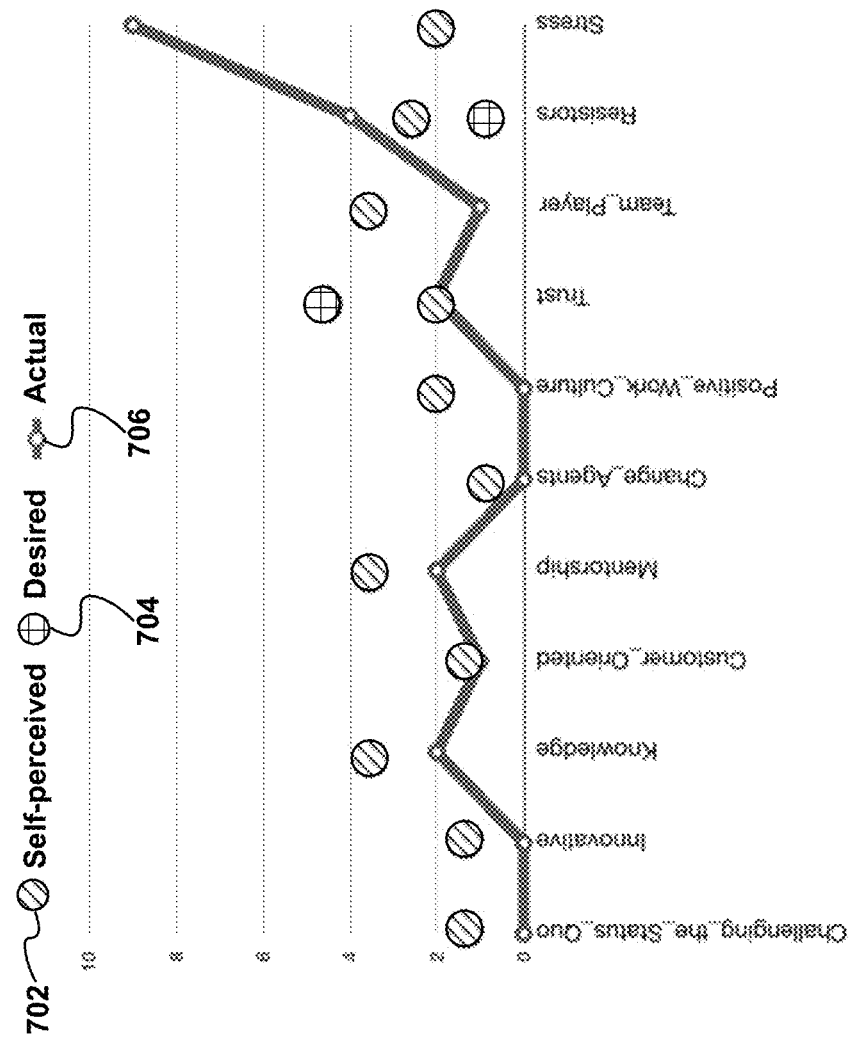
FIG. 7 illustrates an example user interface that displays a graph of self-perceived attributes, desired attributes, and actual (measured) attributes for an individual participant.

FIG. 7 illustrates a user interface 700 that displays a graph of self-perceived attributes 702, desired attributes 704, and actual (measured) attributes 706 for an individual participant, according to an example embodiment. As illustrated in FIG. 7, the self-perceived 702, desired 704, and actual (measured) 706 attributes for this participant differ, some significantly. The user interface 700 displays the results in the form of a line graph showing actual attributes 706 (e.g., as measured by ratings of others), with self-perceived values 702 and desired values 704 superimposed. In some examples, the user interface 700 is an alternative or additional way to display a summary of self-perceived versus actual versus desired attribute data obtained from peers as a result of the rating exercise.

Figure 8:
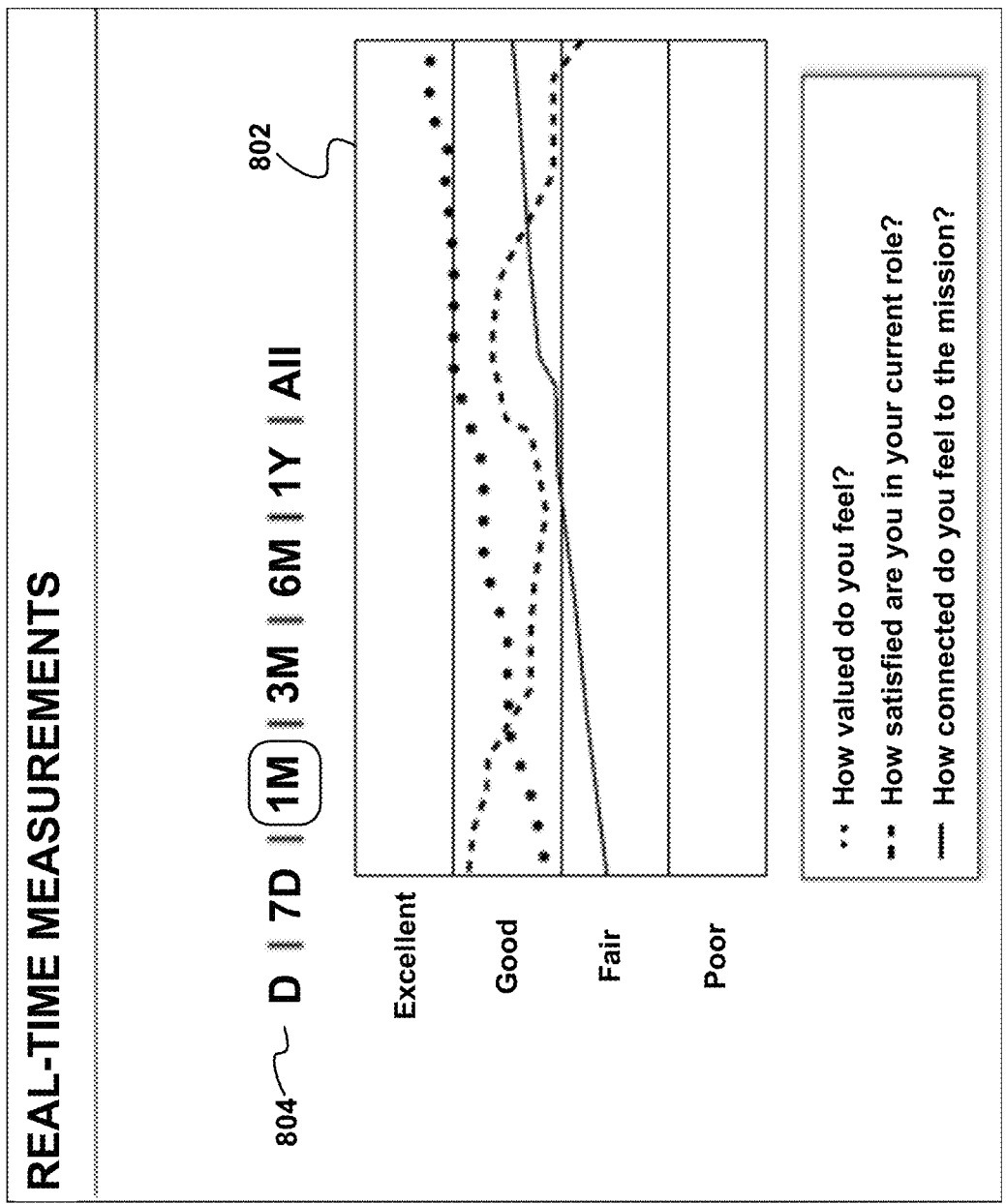
FIG. 8 illustrates an example user interface that allows a user to select a time period to display customized, real-time measurements on a chart.

FIG. 8 illustrates a user interface 800 that allows a user to select a time period to display customized, real-time measurements on a chart 802 (e.g., a line chart), according to an example embodiment. In an embodiment, the system can receive a selection from a user via a control 804 indicating the length of the most recent time period whose measurements are to be displayed on the chart 802. In the illustrated example of FIG. 8, the user can select from "D" indicating the previous day, "7D" indicating the most recent seven days (e.g., week), "1M" indicating the most recent month, etc. Upon selecting a control 804 indicating the time period length, the chart 802 is updated with the ratings gathered from the selected time period.

Figure 9:
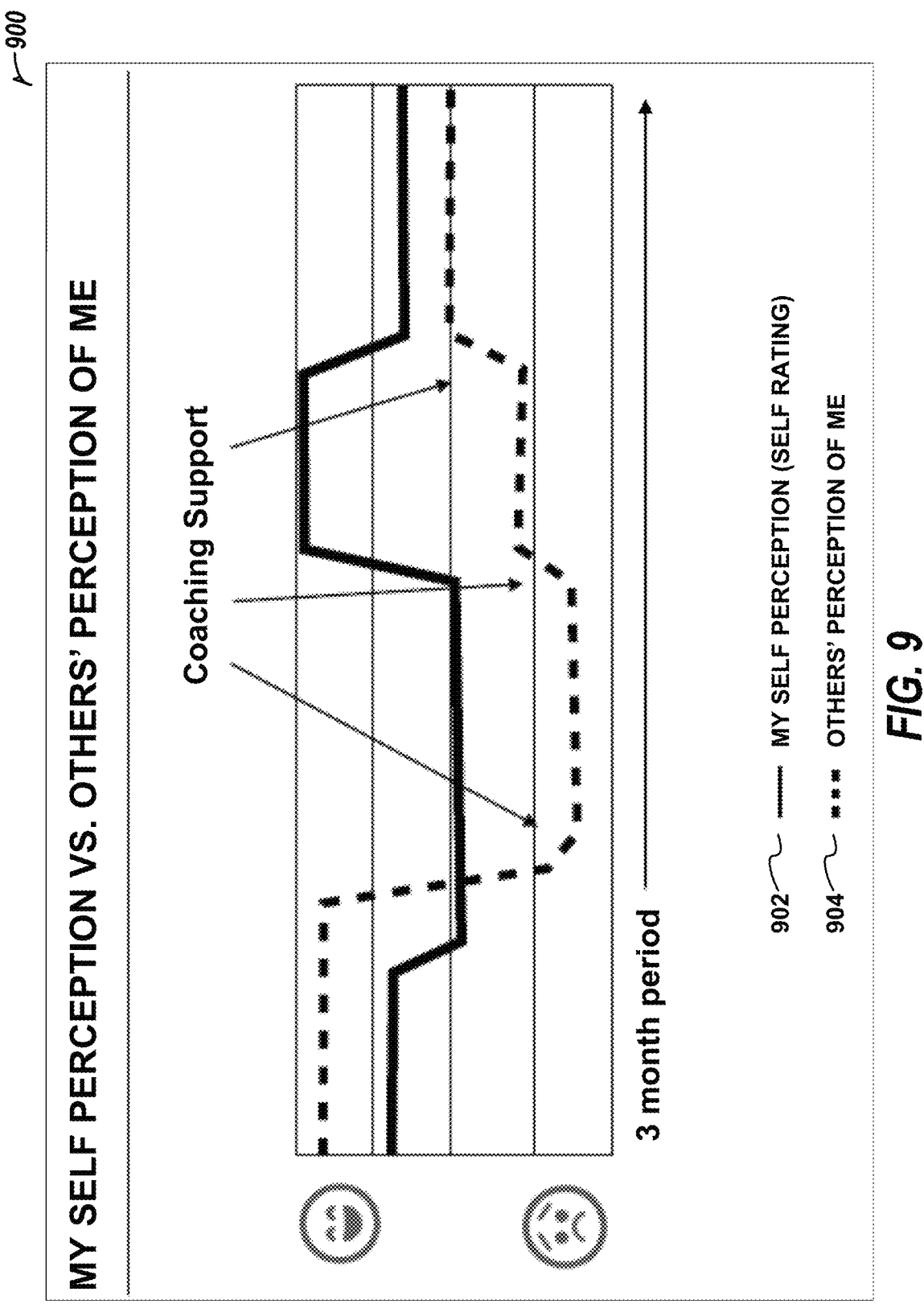
FIG. 9 illustrates an example user interface that displays a chart of the self-perception of an individual's attribute versus others' perceptions of the individual's attribute.

FIG. 9 illustrates a user interface 900 that displays a chart 902 of the self-perception 902 of an individual's attribute versus others' perceptions of the individual's attribute 904, according to an example embodiment. The chart 902 illustrated in the example embodiment of FIG. 9 is another way to display differences between self-ratings and ratings given by others. Further illustrated are user interface elements (e.g., arrows) identifying times where interventions occurred. In this example, the interventions are displayed as arrows indicating times at which the user received coaching support.

Figure 10:
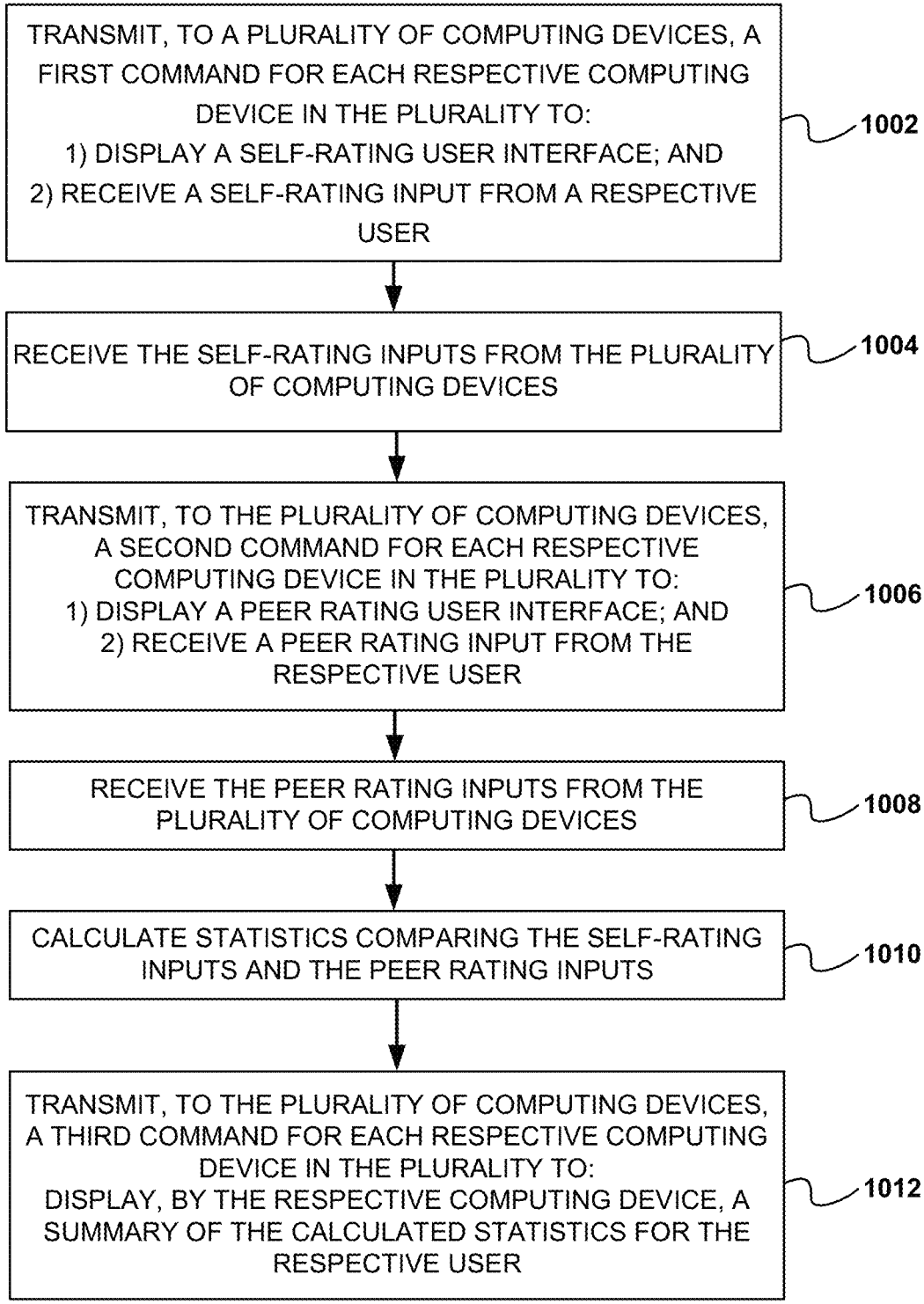
FIG. 10 is an example flowchart illustrating operations performed by a server for performing a rating exercise.

FIG. 10 is a flowchart of a method 1000 illustrating operations performed by a server for performing a rating exercise, according to an example embodiment.

At operation 1002, the server transmits, to a plurality of participant computing devices, a first command for each respective participant computing device in the plurality to: 1) display a self-rating user interface; and 2) receive a self-rating input from a respective user (e.g., a participant in the rating exercise). For example, the self-rating user interface can correspond to user interface 200 and the received self-rating input can correspond to input received over the user interface 200. In some examples, the self-rating user interface is configured to relate to a user rating his or her perception of his or her own attributes. In other examples, the self-rating user interface is configured to relate to a user's ratings of something else.

The transmitted first command can take any of a variety of forms. In some examples, the first command is a set of one or more commands and/or data structures. In some examples, the first command includes one or more commands that cause each participant computing device to render a page or site (e.g., in a browser, such as a web browser) configured to display the self-rating user interface over which self-rating input can be received. In further examples, the first command causes the participant computing device to execute an application configured to display the self-rating user interface over which self-rating input can be received.

In an example, the contents of the self-rating user interface are defined by data obtained from a facilitator that is running the rating exercise. For example, the server can receive, from the facilitator, labels axes of the chart on which the participants are to provide data. In some examples, the facilitator selects from a menu of predefined templates of rating exercises (e.g., having predefined labels and/or other data). Such predefined templates can ease the process of setting up a rating exercise and can facilitate comparison of obtained data with data obtained from other organizations using the same template. In an example, the identities of the participants are received by the server from a facilitator. In some examples, the facilitator or another user transmits links or identifiers of the rating exercise to the participants, who then create accounts or otherwise establish themselves with the server.

At operation 1004, the server receives the self-rating inputs from the plurality of participant computing devices. In an example, the self-rating input is received in the form of x-y coordinates corresponding to a location on a chart, such as in the form of polar or Cartesian coordinates. For example, as a result of the participant computing device receiving input from a user that manipulates the self-rating user interface, the participant computing device sends the received input to the server. In some examples, the received input is sent to the server in real time. In other examples, the received input is sent to the server in a delayed manner (e.g., the received input is held until the user actuates a particular user interface element).

In some examples, following operation 1004, the flow of the method 1000 moves to operation 1010. In other examples, following operation 1004, the flow of the method 1000 moves to operation 1006. In some examples (e.g., those where the rating exercise is configured as an asynchronous rating exercise), prior to the flow of the method moving to operation 1006, the method 1000 waits until a condition is met. For example, the condition is receiving the self-rating inputs from each of the plurality of participant computing devices. In another example, the condition is a facilitator releasing the rating exercise to move to a next step. In an example, the rating exercise is an asynchronous rating exercise and the flow of the method moves from operation 1004 to operation 1006 substantially without delay.

At operation 1006, the server transmits, to the plurality of participant computing devices, a second command for each respective computing device in the plurality to: 1) display a peer rating user interface; and 2) receive a peer rating input from the respective user. In an example, the peer rating user interface corresponds to user interface 300.

The transmitted second command can take any of a variety of forms. In some examples, the second command is a set of one or more commands and/or data structures. In some examples, the second command includes one or more commands that cause each participant computing device to render a page or site (e.g., in a browser, such as a web browser) configured to display the peer rating user interface over which peer-rating input can be received. In further examples, the command causes the participant computing device to execute an application configured to display the peer-rating user interface over which self-rating input can be received.

At operation 1008, the server receives the peer rating inputs from the plurality of computing devices. In an example, the self-rating input is received in the form of x-y coordinates corresponding to a location on a chart for each of the peers that are rated. In other examples, the self-rating input is received in the form of polar coordinates or other formats.

Following operation 1008, the flow of the method 1000 moves to operation 1010. In some examples (e.g., those where the rating exercise is configured as an asynchronous rating exercise), prior to the flow of the method moving to operation 1008, the method 1000 waits until a condition is met. For example, the condition is receiving the peer-rating inputs from each of the plurality of participant computing devices. In another example, the condition is a facilitator releasing the rating exercise to move to a next step. In an example, the rating exercise is an asynchronous rating exercise and the flow of the method moves from operation 1008 to operation 1010 substantially without delay.

At operation 1010, the server calculates statistics comparing the self-rating inputs and the peer rating inputs. In an example, the calculations include calculating an average, standard deviation, variance, other calculations, or combinations thereof. In an example, the calculations include calculating an average rating of a participant by other participants.

In some examples, operation 1010 occurs substantially once for the received peer rating inputs and self-rating inputs. In other examples, the operation 1010 occurs multiple times as the received peer rating inputs and self-rating inputs are obtained. For instance, where the rating exercise is configured as asynchronous, the flow may move from operation 1010 to operation 102 in which a summary of the statistics are provided to the user. In some examples, while the statistics are provided to the user as part of a summary user interface, new data is received as part of operation 1008. The server recalculates the statistics in view of the newly received data and updates the user interface in operation 1012.

At operation 1012, the server transmits, to the plurality of participant computing devices, a third command for each respective participant computing device in the plurality to: display, by the respective participant computing device, a summary of the calculated statistics for the respective user. In an example, the summary is provided in a user interface similar to user interface 400. In an example, the summary can compare the participant's organization against other organizations that have performed the review exercise (e.g., using a standard, predefined template that is used across organizations) so that comparisons across populations can be made.

The transmitted third command can take any of a variety of forms. In some examples, the third command is a set of one or more commands and/or data structures. In some examples, the third command includes one or more commands that cause each participant computing device to render a page or site (e.g., in a browser, such as a web browser) configured to display the summary. In further examples, the third command causes the participant computing device to execute an application configured to display the summary.

In an embodiment, the rating exercise can be performed as a facilitated meeting, where each participant is given a link (e.g., URL) to a page (e.g., a web page) that allows the server to begin a rating exercise to each participant in a group that accesses the page. The facilitator then directs the group of participants through the stages of the rating exercise. Such an embodiment is considered a "synchronous" embodiment because the exercise cannot progress to a subsequent stage of the rating exercise until the current stage of the exercise has been completed by all of the group's participants.

In an embodiment, the rating process can be deployed as a remotely accessible software platform. Each participant of the rating process is assigned a unique identifier (e.g., username), and each participant is either assigned or required to choose his or her own password or other authentication scheme. When a participant wishes to perform their portion of the rating process, the participant may log into the software platform provided by the server remotely (e.g., via the Internet) using the participant's username and password. The platform then causes the participant's computing device to display the user interfaces of the rating process. Such an embodiment is considered an "asynchronous" embodiment because each participant's progress through the stages of the rating exercise is independent of the progresses of all other participants.

In an embodiment, the rating exercise can be deployed as a networked (e.g., web-based) system. Each participant is given a link (e.g., URL) that is unique to the participant. The participant uses the link to access a networked location (e.g., web site) to perform the rating exercise. Such an embodiment is considered an "asynchronous" embodiment because each participant's progress through the stages of the rating exercise is independent of the progresses of all other participants.

Figure 11:
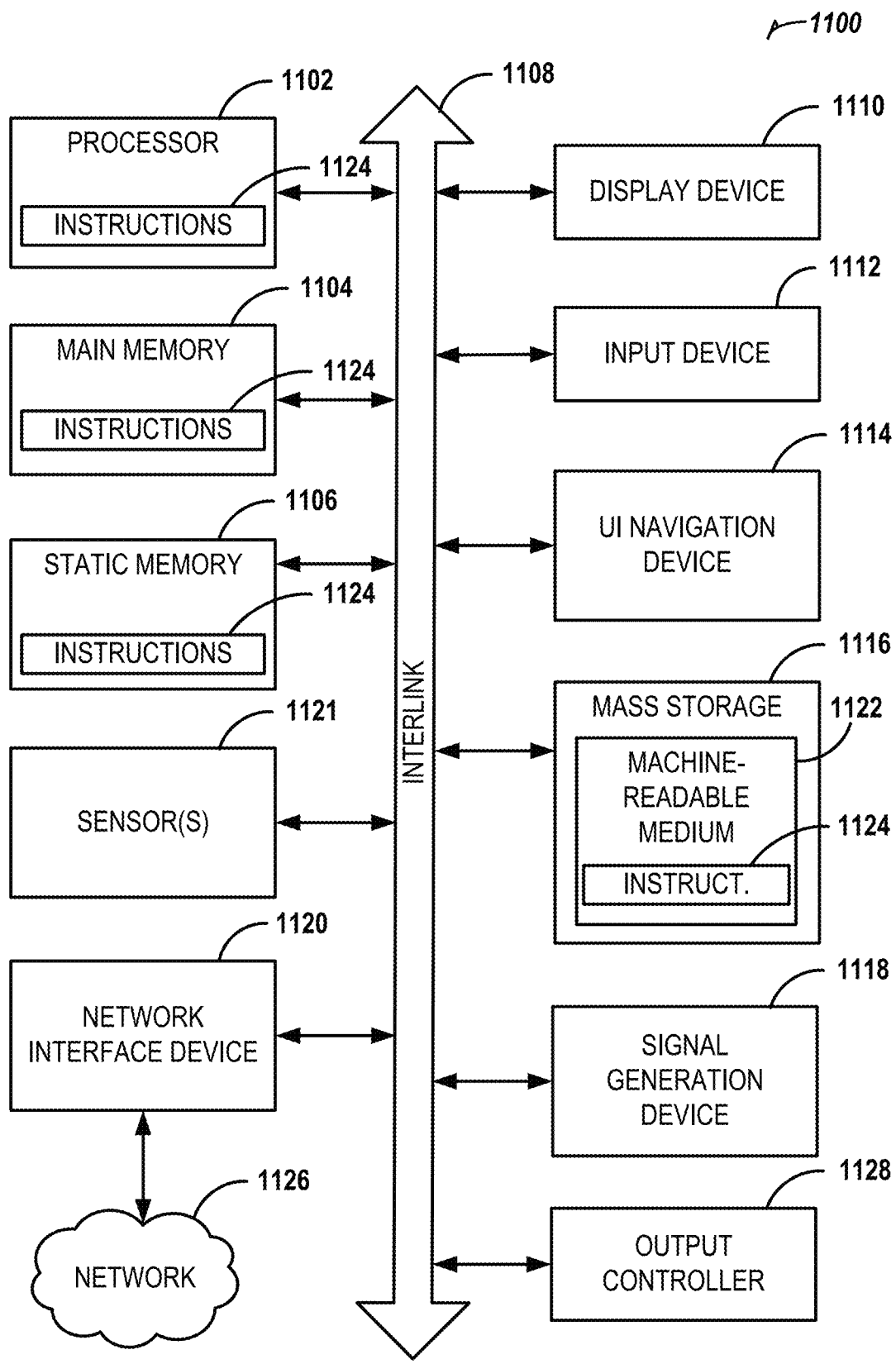
FIG. 11 is an example block diagram illustrating an example of a machine, upon which any one or more example embodiments can be implemented.

FIG. 11 is a block diagram illustrating an example of a machine 1100, upon which any one or more example embodiments may be implemented, such as the above-described server or participant computing devices. Further, the system as described above can be implemented using such a machine 1100 configured to perform one or more operations or tasks as described above.

In an example, the machine 1100 operates as a standalone device or may be connected (e.g., networked) to other machines. In a networked deployment, the machine 1100 may operate in the capacity of a server machine, a client machine, or both in a client-server network environment. In an example, the machine 1100 may act as a peer machine in a peer-to-peer (P2P) (or other distributed) network environment. The machine 1100 may implement or include any portion of the systems, devices, or methods illustrated in FIGS. 1-10, and may be a computer, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include one or more hardware processors 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., USB, parallel, or other wired or wireless (e.g., infrared (IR), near field communication (NFC), etc.) connection to communicate or control one or more peripheral devices (e.g., a printer, card reader, etc.).

The storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

Although the machine-readable medium 1122 is illustrated as a single medium, the term "machine-readable medium" may include a single medium or multiple media (e.g., a centralized or distributed database, and/or associated caches and servers) configured to store the one or more instructions 1124.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 1124 may further be transmitted or received over a communications network 1126 using a transmission medium via the network interface device 1120 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi Fi®, IEEE 802.16 family of standards known as WiMAX®), IEEE 802.15.4 family of standards, Bluetooth®, Bluetooth® low energy technology, ZigBee®, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Examples disclosed above include relational rating exercises where participants are given the opportunity to rate one or more of their peers. Examples disclosed above further describe rating systems that can be used to provide feedback or ratings irrespective of peers, which can be described as non-relational.

In a non-relational mode, a facilitator can design one or more matrices (e.g., a one-quadrant matrix or a four quadrant matrix) and designate any number of dot labels (e.g., selectors or selections corresponding to particular data) with customizable colors or other distinctions. A user interface displaying such matrices can permit participants to move the labels to indicate their feelings and sentiment around a given subject. Axes can be configured to be fully customizable by a facilitator to permit full freedom of feedback around any dimensions and topics chosen by the facilitator. Examples are shown in FIGS. 12 and 13

Figure 12:
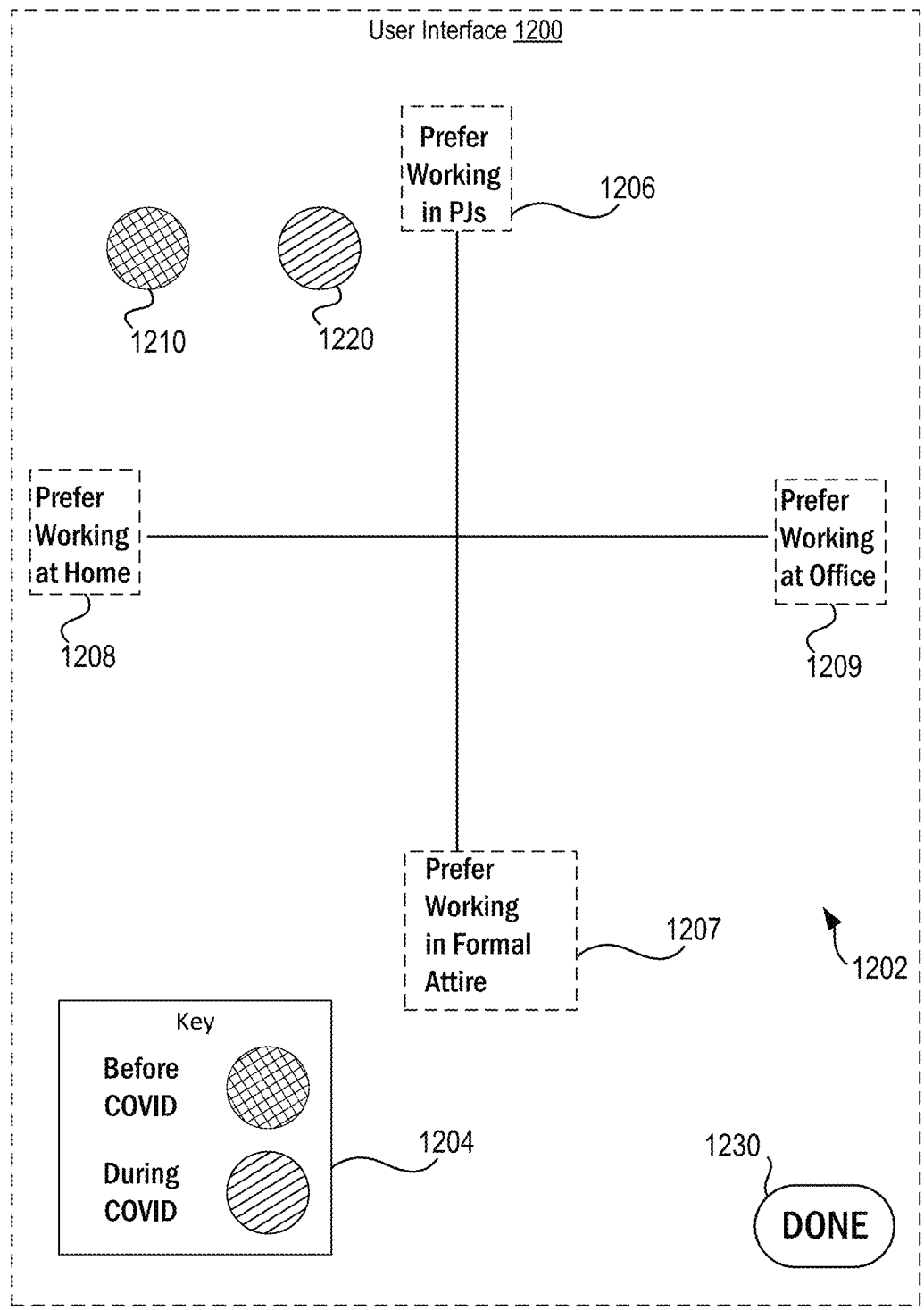
FIG. 12 illustrates an example user interface showing a non-relational four quadrant matrix and a key for the matrix.
Figure 13:
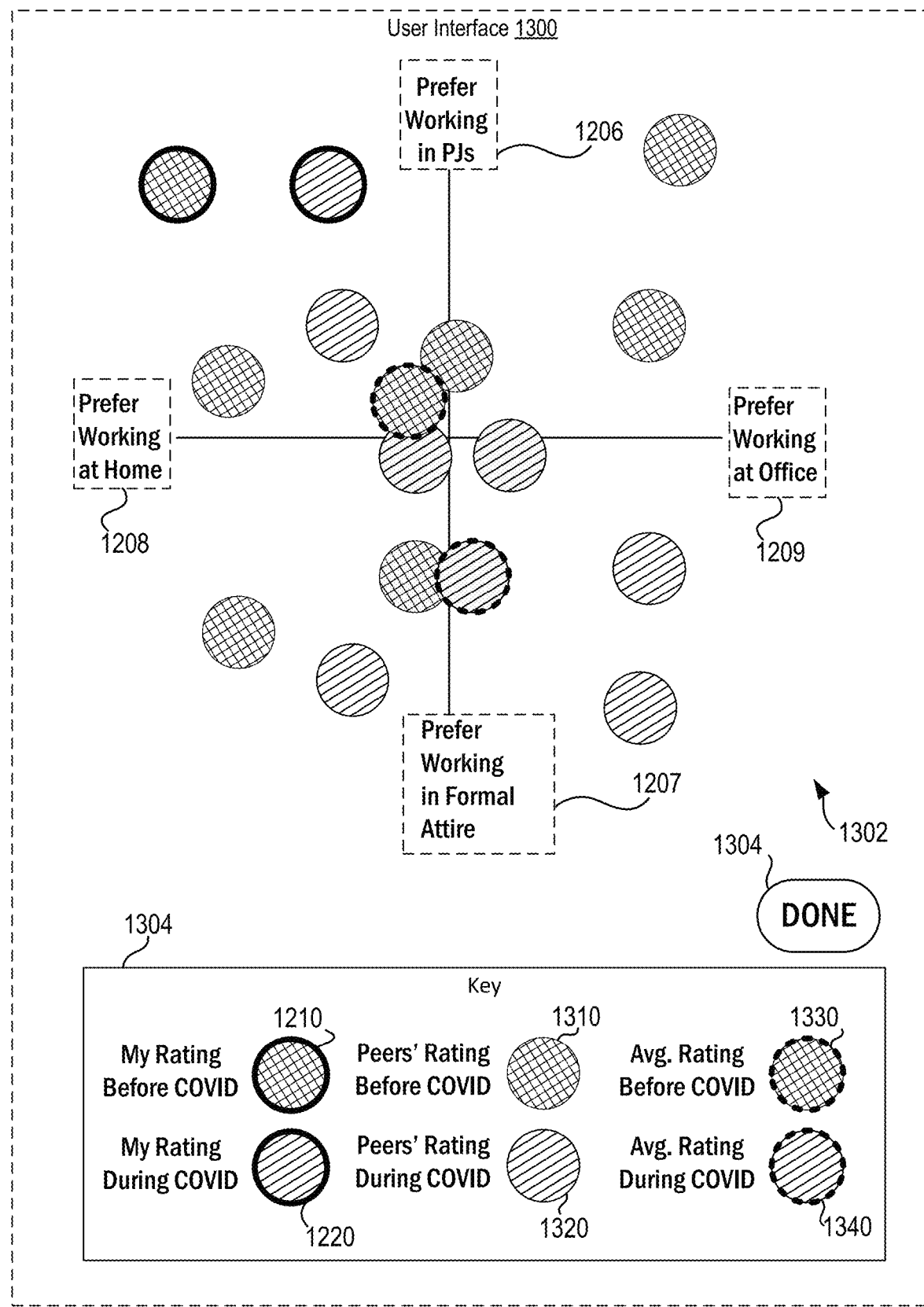
FIG. 13 illustrates an example group rating user interface configured to display a summary of input received from multiple users.

FIG. 12 illustrates an example user interface 1200 showing a non-relational four quadrant matrix 1202 and a key 1204 for the matrix 1202. The matrix includes a first label 1206 ("prefer working in PJs") and a second label 1207 ("prefer working in formal attire") at opposite ends of a first continuum ("prefer working in PJs" vs "prefer working in formal attire"). The matrix further includes a third label 1208 ("prefer working at home") and a fourth label 1209 ("prefer working at office") at opposite ends of a second continuum ("prefer working at home" vs "prefer working at office"). The user interface 1200 includes a first selection 1210 and a second selection 1220. The first selection 1210 and the second selection 1220 are user interface elements manipulatable by a user to provide input. In the illustrated example, the first selection 1210 corresponds to the user's sentiment at a first time period ("Before COVID") and the second selection 1220 corresponds to the user's sentiment regarding a second time period ("After COVID"). The selections 1210, 1220 can be manipulated by the user to move the selections 1210, 1220 to a location within the matrix that corresponds to the user's sentiment regarding the labels and selection. For instance, the closer a selection 1210, 1220 is located to a particular label 1206, 1207, 1208, 1209 indicates a greater level of agreement with or applicability of the statement corresponding to the label 1206, 1207, 1208, 1209. Although the current example relates to the manipulation of the selections 1210, 1220 within the matrix, other techniques can be used. For example, to receive the self-rating input, the user interface 1200 can include one or more of a chart, a graph, a slider, radio boxes, checkboxes, etc.

The system can receive data over the user interface 1200 in any of a variety of different ways. For instance, if a selection 1210, 1220 within a control of the self-rating user interface 1200 is not already a numerical value, the selection 1210, 1220 is converted into a numerical value. In the example illustrated in FIG. 12, the four-quadrant chart 1202 uses a Cartesian coordinate system, where each selection 1210, 1220 is converted into a point having an x component and a y component denoting the values of the selection 1210, 1220 projected onto the x and y axes, respectively. Other examples can use other coordinate systems (e.g., a polar coordinate) or techniques to specify data.

The user interface 1200 further includes a user interface element 1230 selectable by the user to indicate that the user completed entry of the selections 1210, 1220. For instance, responsive to actuation of the user interface element, the system can take the user to a wait screen (e.g., in the example of a synchronous rating exercise) or to a next user interface screen, such as is shown in FIG. 13 (e.g., in the example of an asynchronous rating exercise).

FIG. 13 illustrates an example group rating user interface 1300 configured to display a summary of input received from multiple users. For instance, after input is received from one or more of the users (e.g., using the user interface 1200 of FIG. 12), the system causes the user's device to present the group rating user interface 1300. The group rating user interface 1300 can be configured to provide a summary of data obtained from the user's peers (e.g., other users in the group that are participating in this rating activity). In the illustrated example, the group rating user interface 1300 includes a chart 1302 similar to the chart 1202 of FIG. 12 (e.g., a four quadrant chart) but populated with selections obtained from multiple users regarding the labels 1206, 1207, 1208, 1209.

The illustrated chart 1302 further includes the user's selections 1210, 1220 as distinct from peers' selections 1310, 1320. The chart 1302 further includes indications of the results of statistical output as selections 1330, 1340.

The user interface 1300 further includes a user interface element 1304 selectable by the user to indicate that the user is finished with the user interface 1300. Actuation of the user interface element 1304 can cause the system to cease providing the user interface 1300 or to take the user to another user interface.

In examples, the facilitator can analyze and share the data of the user interface 1300 with an audience. The data can be further processed and analyzed in real-time by calculating averages standard deviations, variance, and other statistical measures for the provided data.

Example Embodiments

Example 1 is a method for providing dynamic self-awareness within a human network, the method comprising: transmitting, by a server to a plurality of computing devices, a first command for each respective computing device in the plurality of computing devices to: display a self-rating user interface; and receive a self-rating input from a respective user; receiving, by the server, the self-rating inputs from the plurality of computing devices; transmitting, by the server to the plurality of computing devices, a second command for each respective computing device in the plurality of computing devices to: display, a peer rating user interface; and receive a peer rating input from the respective user; receiving, by the server, the peer rating inputs from the plurality of computing devices; calculating statistics comparing the self-rating inputs and the peer rating inputs; and transmitting, by the server to the plurality of computing devices, a third command for each respective computing device in the plurality of computing devices to: display a summary of the calculated statistics of the respective user.

In Example 2, the subject matter of Example 1 optionally includes wherein the summary of the calculated statistics of a respective user includes at least one of: the respective user's self-rating; the ratings of the respective user by other users; the average of the ratings of the respective user by other users; the average self-rating of all users; and the average of all users' ratings of other users.

In Example 3, the subject matter of any one or more of Examples 1-2 optionally include wherein the summary of the calculated statistics of a respective user includes data collected during one rating exercise.

In Example 4, the subject matter of any one or more of Examples 1-3 optionally include wherein the summary of the calculated statistics of a respective user includes data collected during a plurality of rating exercises, and wherein no more than one rating exercise in the plurality of rating exercises was performed on a given day.

In Example 5, the subject matter of any one or more of Examples 1-4 optionally include generating a human network map of the respective users.

In Example 6, the subject matter of any one or more of Examples 1-5 optionally include wherein the self-rating input includes at least one of: a self-perceived rating; and a desired rating.

Example 7 is a system for providing dynamic self-awareness within a human network, the system comprising: a plurality of computing devices; and a server, wherein the server is configured to: transmit, to the plurality of computing devices, a first command for each respective computing device in the plurality of computing devices to: display a self-rating user interface; and receive a self-rating input from a respective user; receive the self-rating inputs from the plurality of computing devices; transmit, to the plurality of computing devices, a second command for each respective computing device in the plurality of computing devices to: display, a peer rating user interface; and receive a peer rating input from the respective user; receive the peer rating inputs from the plurality of computing devices; calculate statistics comparing the self-rating inputs and the peer rating inputs; and transmit, to the plurality of computing devices, a third command for each respective computing device in the plurality of computing devices to: display a summary of the calculated statistics of the respective user.

In Example 8, the subject matter of Example 7 optionally includes wherein the summary of the calculated statistics of a respective user includes at least one of: the respective user's self-rating; the ratings of the respective user by other users; the average of the ratings of the respective user by other users; the average self-rating of all users; and the average of all users' ratings of other users.

In Example 9, the subject matter of any one or more of Examples 7-8 optionally include wherein the summary of the calculated statistics regarding a respective user includes data collected during one rating exercise.

In Example 10, the subject matter of any one or more of Examples 7-9 optionally include wherein the summary of the calculated statistics of a respective user includes data collected during a plurality of rating exercises, and wherein no more than one rating exercise in the plurality of rating exercises was performed on a given day.

In Example 11, the subject matter of any one or more of Examples 7-10 optionally include generating a human network map of the respective users.

In Example 12, the subject matter of any one or more of Examples 7-11 optionally include wherein the self-rating input includes at least one of: a self-perceived rating; and a desired rating.

Example 13 is a machine-readable storage medium comprising instructions that, when executed by a processor of a machine, cause the machine to: transmit, to a plurality of computing devices, a first command for each respective computing device in the plurality of computing devices to: display a self-rating user interface; and receive a self-rating input from a respective user; receive the self-rating inputs from the plurality of computing devices; transmit, to the plurality of computing devices, a second command for each respective computing device in the plurality of computing devices to: display, a peer rating user interface; and receive a peer rating input from the respective user; receive the peer rating inputs from the plurality of computing devices; calculate statistics comparing the self-rating inputs and the peer rating inputs; and transmit, to the plurality of computing devices, a third command for each respective computing device in the plurality of computing devices to: display a summary of the calculated statistics of the respective user.

In Example 14, the subject matter of Example 13 optionally includes wherein the summary of the calculated statistics of a respective user includes at least one of: the respective user's self-rating; the ratings of the respective user by other users; the average of the ratings of the respective user by other users; the average self-rating of all users; and the average of all users' ratings of other users.

In Example 15, the subject matter of any one or more of Examples 13-14 optionally include wherein the summary of the calculated statistics of a respective user includes data collected during one rating exercise.

In Example 16, the subject matter of any one or more of Examples 13-15 optionally include wherein the summary of the calculated statistics of a respective user includes data collected during a plurality of rating exercises, and wherein no more than one rating exercise in the plurality of rating exercises was performed on a given day.

In Example 17, the subject matter of any one or more of Examples 13-16 optionally include instructions that, when executed by the processor of the machine, cause the machine to: generate a human network map of the respective users.

In Example 18, the subject matter of any one or more of Examples 13-17 optionally include wherein the self-rating input includes at least one of: a self-perceived rating; and a desired rating.

Each of these non-limiting examples may stand on its own, or may be combined in various permutations or combinations with one or more of the other examples.

Conventional terms in the fields of computer systems and cryptology have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects. In this document, a sensor set may include one or more sensors, which may be of different types. Furthermore, two different sensor sets may include one or more sensors that belong to both sensor sets.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The above description is intended to be illustrative, and not restrictive. For example, the above-described examples (or one or more aspects thereof) may be used in combination with each other. Other embodiments may be used, such as by one of ordinary skill in the art upon reviewing the above description.

What is claimed is:

1. A method comprising:
    transmitting, by a server to a plurality of computing devices associated with users within a network, a first command for each respective computing device in the plurality of computing devices to:
        display a self-rating user interface; and
        receive a self-rating input from a respective user;
    receiving, by the server, self-rating inputs from the plurality of computing devices;
    synchronizing a self-rating collection by:
        transmitting, by the server to the plurality of computing devices, a second command to each computing device in the plurality of computing devices to display a first wait screen on a user interface; and
        waiting until all of the self-rating inputs from the plurality of computing devices are received by the server;
    upon the server receiving all of the self-rating inputs,
        releasing the plurality of computing devices from displaying the first wait screen on the user interface by transmitting, by the server to the plurality of computing devices, a third command for each respective computing device in the plurality of computing devices to:
            display, a peer rating user interface; and
            receive a peer rating input from the respective user;
    receiving, by the server, peer rating inputs from the plurality of computing devices associated with the users within the network;
    synchronizing a peer rating collection by:
        transmitting, by the server to the plurality of computing devices, a fourth command to each computing device in the plurality of computing devices to display a second wait screen on the user interface; and
        waiting until all of the peer rating inputs from the plurality of computing devices are received by the server;
    upon the server receiving all of the peer rating inputs,
        calculating statistics comparing the self-rating inputs and the peer rating inputs; and
        based on the peer rating inputs from the plurality of computing devices, generating a human network map that represents informal relationships between the users within the network, and
        releasing the plurality of computing devices from displaying the second wait screen on the user interface by transmitting, by the server to the plurality of computing devices, a fifth command for each respective computing device in the plurality of computing devices to:
            display a summary of statistics of the respective user, including, displaying a four-quadrant matrix that receives inputs along two continuums of user characteristics on the user interface;
            display the human network map on the user interface, including, displaying:
                a plurality of nodes with each node of the plurality of nodes representing a user within the network; and
                one or more lines, with each line of the one or more lines extending between two nodes of the plurality of nodes within the human network map, a first node of the two nodes representing a first user that has provided a peer rating for a second user and a second node of the two nodes representing the second user; and
            dynamically modify the user interface with an updated summary of the statistics and an updated human network map in real time as updated self-rating inputs and updated peer rating inputs are received.

2. The method of claim 1, wherein the summary of the statistics of the respective user includes at least one of:
    a self-rating of the respective user;
    ratings of the respective user by other users;
    an average of the ratings of the respective user by other users;
    an average self-rating of all users; and
    an average of all users' ratings of other users.

3. The method of claim 1, wherein the summary of the statistics of the respective user includes data collected during one rating exercise.

4. The method of claim 1, wherein the summary of the statistics of the respective user includes data collected during a plurality of rating exercises, and wherein no more than one rating exercise in the plurality of rating exercises was performed on a given day.

5. The method of claim 1, wherein the self-rating input includes at least one of:
   a self-perceived rating; and
   a desired rating.

6. A system comprising:
   a plurality of computing devices associated with users within a network; and
   a server, wherein the server is configured to:
   transmit, to the plurality of computing devices, a first command for each respective computing device in the plurality of computing devices to:
      display a self-rating user interface; and
      receive a self-rating input from a respective user;
   receive self-rating inputs from the plurality of computing devices;
   synchronize a self-rating collection by configuring the server to:
      transmit, by the server to the plurality of computing devices, a second command to each computing device in the plurality of computing devices to display a first wait screen on a user interface; and
      wait until all of the self-rating inputs from the plurality of computing devices are received by the server;
   upon the server receiving all of the self-rating inputs,
      release the plurality of computing devices from displaying the first wait screen on the user interface by transmitting, to the plurality of computing devices, a third command for each respective computing device in the plurality of computing devices to:
         display, a peer rating user interface; and
         receive a peer rating input from the respective user;
   receive peer rating inputs from the plurality of computing devices;
   synchronize a peer rating collection by configuring the server to:
      transmit, by the server to the plurality of computing devices, a fourth command to each computing device in the plurality of computing devices to display a second wait screen on the user interface; and
      wait until all of the peer rating inputs from the plurality of computing devices are received by the server;
   upon the server receiving all of the peer rating inputs,
      calculate statistics comparing the self-rating inputs and the peer rating inputs;
      based on the peer rating inputs from the plurality of computing devices, generate a human network map that represents informal relationships between the users within the network, and
      release the plurality of computing devices from displaying the second wait screen on the user interface by transmitting, to the plurality of computing devices, a fifth command for each respective computing device in the plurality of computing devices to:
         display a summary of statistics of the respective user, including, displaying a four-quadrant matrix that receives inputs along two continuums of user characteristics on the user interface;
         display the human network map on the user interface, including, displaying:
            a plurality of nodes with each node of the plurality of nodes representing a user within the network; and
            one or more lines, with each line of the one or more lines extending between two nodes of the plurality of nodes within the human network map, a first node of the two nodes representing a first user that has provided a peer rating for a second user and a second node of the two nodes representing the second user; and
         dynamically modify the user interface with an updated summary of the statistics and an updated human network map in real time as updated self-rating inputs and updated peer rating inputs are received.

7. The system of claim 6, wherein the summary of the statistics of the respective user includes at least one of:
   a self-rating of the respective user;
   ratings of the respective user by other users;
   an average of the ratings of the respective user by other users;
   an average self-rating of all users; and
   an average of all users' ratings of other users.

8. The system of claim 6, wherein the summary of the statistics regarding the respective user includes data collected during one rating exercise.

9. The system of claim 6, wherein the summary of the statistics of the respective user includes data collected during a plurality of rating exercises, and wherein no more than one rating exercise in the plurality of rating exercises was performed on a given day.

10. The system of claim 6, further comprising:
   generating a human network map of respective users.

11. The system of claim 6, wherein the self-rating input includes at least one of:
   a self-perceived rating; and
   a desired rating.

12. A method comprising:
   transmitting, by a server to a plurality of computing devices associated with users within a network, a first command for each computing device of the plurality of computing devices to display a request for self-rating inputs on a user interface display;
   receiving, by the server, the self-rating inputs from the plurality of computing devices;
   transmitting, by the server to the plurality of computing devices, a second command to each computing device to display, a request for peer rating inputs on the user interface;
   receiving, by the server, the peer rating inputs from the plurality of computing devices associated with the users within the network;
   synchronizing processing of the self-rating inputs and the peer rating inputs by:
      transmitting a third command to each computing device in the plurality of computing devices to display a wait screen on the user interface; and
      waiting until the self-rating inputs and the peer rating inputs from all of the plurality of computing devices are received by the server;
   upon the server receiving the self-rating inputs and the peer rating inputs from the plurality of computing devices,
      based on the peer rating inputs from the plurality of computing devices, generating a human network map that represents informal relationships between the users within the network, and
      releasing the plurality of computing devices from displaying the wait screen on the user interface by transmitting, by the server to the plurality of computing devices, a fourth command to each computing device in the plurality of computing devices to:
display the human network map on the user interface, the human network map including:
a plurality of nodes with each node of the plurality of nodes representing a user within the network;
one or more lines, with each line of the one or more lines extending between two nodes of the plurality of nodes within the human network map, a first node of the two nodes representing a first user that has provided a peer rating for a second user and a second node of the two nodes representing the second user.

13. The method of claim 12, further comprising:
upon the server receiving the self-rating inputs and the peer rating inputs from the plurality of computing devices, calculating statistics comparing the self-rating inputs and the peer rating inputs.

14. The method of claim 13, further comprising:
transmitting, by the server to the plurality of computing devices, a fifth command to each computing device in the plurality of computing devices to display a summary of statistics of at least one user of the users within the network.

15. Method of claim 14, wherein the summary of the statistics of the at least one user includes at least one of:
a self-rating of the user;
peer ratings for the user by other users;
an average of the peer ratings for the user;
an average self-rating of all users; and
an average of all users' ratings of other users.

16. The method of claim 14, wherein the summary of the statistics of the at least one user includes data collected during one rating exercise.

17. The method of claim 14, wherein the summary of the statistics of the at least one user includes data collected during a plurality of rating exercises, and wherein no more than one rating exercise in the plurality of rating exercises was performed on a given day.

18. The method of claim 12, further comprising:
dynamically modify a size of at least one of the plurality of nodes to be proportional to a number of lines extending from the at least one of the plurality of nodes.

19. The method of claim 12, further comprising:
transmitting, by the server to the plurality of computing devices, a uniform resource locator (URL) to begin a rating exercise, wherein selecting the URL using a computing device of the plurality of computing devices causes the display of the request for the self-rating inputs on the user interface display.

20. The method of claim 12, wherein the self-rating inputs include at least one of:
a self-perceived rating; and
a desired rating.

* * * * *